United States Patent [19]

Andrews et al.

[11] Patent Number: 4,701,068
[45] Date of Patent: Oct. 20, 1987

[54] SPLINE ANTI-BACKLASH DEVICE

[75] Inventors: Rodney R. Andrews, Utica; John H. Ferguson, Sauquoit; Frederick A. Kaiser, Clinton; William E. Coman, Newport, all of N.Y.

[73] Assignee: Allied Corporation, Morris Township, Morris County, N.J.

[21] Appl. No.: 864,380

[22] Filed: May 19, 1986

[51] Int. Cl.$^4$ ........................... B25G 3/28; F16B 3/00
[52] U.S. Cl. ........................................ 403/359; 74/409
[58] Field of Search .................. 403/359; 74/440, 409

[56] References Cited
U.S. PATENT DOCUMENTS

| | | | |
|---|---|---|---|
| 2,696,124 | 12/1954 | Flowers et al. | 74/440 X |
| 3,020,775 | 2/1962 | Musser | 74/409 X |
| 3,803,936 | 4/1974 | Kroeper | 74/409 |
| 3,951,118 | 4/1976 | Henson | 403/359 X |
| 4,348,956 | 9/1982 | Schmidlin | 403/359 X |
| 4,422,344 | 12/1983 | Wutherich | 74/440 X |
| 4,473,317 | 9/1984 | Bolang | 403/359 |
| 4,554,842 | 11/1985 | Wood, III | 74/440 X |
| 4,601,601 | 7/1986 | Morris | 403/359 |

OTHER PUBLICATIONS

2 Sheet Article, Title 1976 British Leyland Princess 2200.

Primary Examiner—Cornelius J. Husar
Assistant Examiner—Todd G. Williams
Attorney, Agent, or Firm—Howard G. Massung; Stanley N. Protigal; Anthony F. Cuoco

[57] ABSTRACT

A shaft assembly (11) having a spline (16) with an antibacklash device operable due to centrifugal force to engage both sides of internal spline teeth during rotation. The spline (16) includes a main force transmitting portion (18) and a moveable spline sleeve (22) which during operation engages the side of teeth opposite the side engaged by the main force transmitting spline. Spline sleeve (22) rides on helix member to move slightly circumferentially as it is moved axially by a centrifugal force actuated member. A bar which is pinned to the spline (16) has one end which moves radially outward due to centrifugal force as the spline (16) is rotated and another end which engages and moves the spline sleeve (22) axially. When the spline sleeve (22) is moved, the splined end on the shaft assembly (11) is locked or wedged into engagement with the mating internal spline (14).

11 Claims, 7 Drawing Figures

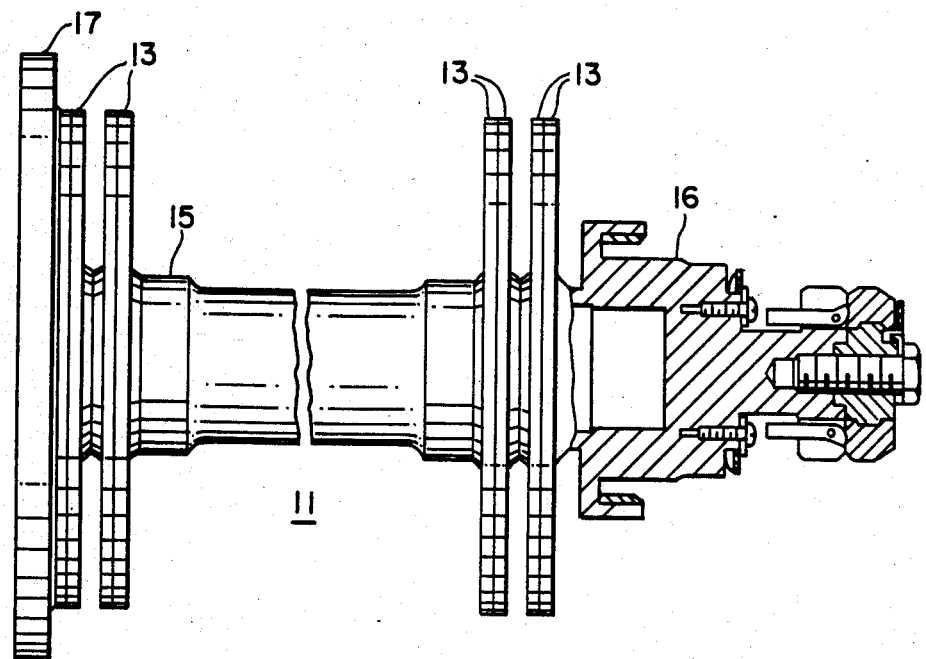
FIG. 2
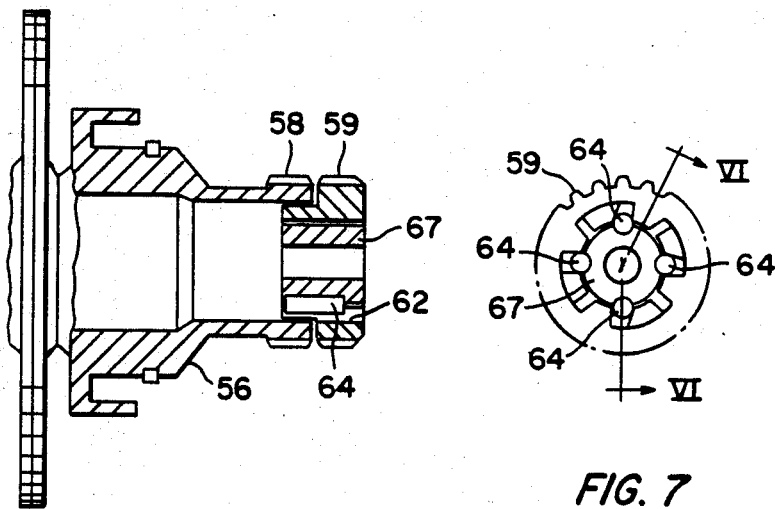
FIG. 6
FIG. 7

SPLINE ANTI-BACKLASH DEVICE

BACKGROUND OF THE INVENTION

1. Field of the Invention

This invention relates to the field of mechanical couplings which connect rotatable shafts and more particularly to a spline having an anti-backlash device for interconnecting rotating members.

2. Description of Prior Art

Use of an internal spline which engages a mating external spline for transmitting rotary torque is well known in the prior art. A straight spline which engages a mating straight spline for the transmission of power does not have any means to seek its center, and in order to limit wear of the spline good pilots are often provided on both ends of the spline shaft assembly. However, if proper pilots are not provided and the splines do not mate with a close fit, the loose splines tend to rock and wear excessively.

Splines according to the present invention are locked, rocking is stopped and the splines will show less wear.

SUMMARY OF THE INVENTION

The present invention is for a spline anti-backlash device which utilizes centrifugal force to force teeth on a portion of an external spline to engage or lock into the mating teeth on an internal spline. A splined sleeve which forms part of the external spline is moved and slightly rotated to lock or wedge the external spline into the mating internal spline. The splined sleeve can be supported on a hollow external helix so that when the spline coupling rotates, torque is created on the straight spine of the sleeve opposite that of the main torque transmitting spline. Formed centrifugally actuated weights with a force multiplier are provided which move the splined sleeve on the external helix as the spline coupling rotates.

BRIEF DESCRIPTION OF THE DRAWINGS

For a better understanding of the invention, reference may be had to the preferred embodiments thereof shown in the accompanying drawings wherein:

FIG. 2 is a side view of a spline shaft assembly according to the present invention;

FIG. 6 is a section view of a portion of the spline shown in FIG. 7 taken along the line VI—VI; and FIG. 7 is a partial view of a spline, according to another embodiment of the invention, utilizing cylinders to provide the required centrifugal force.

DETAILED DESCRIPTION OF THE INVENTION

Figure 1:
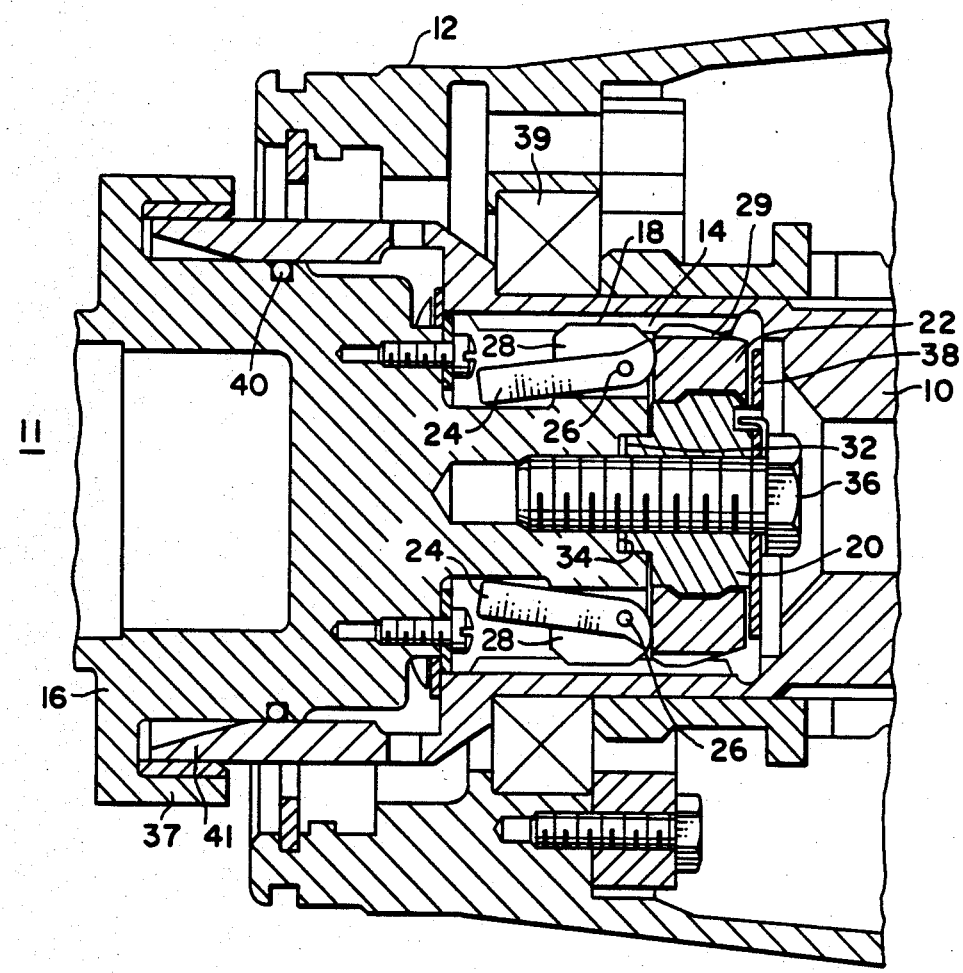
FIG. 1 is a sectioned view of a spline with an anti-backlash device according to the teaching of the present invention.

Referring now to the drawings and FIGS. 1 and 2 in particular, there is shown a section view of the preferred embodiment of the invention in which an output coupling 16, on shaft assembly 11, is provided with an anti-backlash device. A shaft 10 having an internal spline 14 for transmitting force to the output coupling 16 is provided. Shaft 10 rotates on bearing 39 supported in a housing 12. Output coupling 16 extends into an opening in member 12. Output coupling 16 includes an external spline portion 18 which fits into and is engaged by internal spline 14. As internal spline 14 is rotated, the teeth on external spline 18 are contacted and output torque is transmitted through coupling 16.

An annular pilot portion 37 is provided on coupling 16. Pilot portion 37 fits around the outer end 41 of shaft 10 to center the coupling 16 with respect to shaft 10. Spline actin of shaft assembly 11 will pivot about this pilot fit.

Shaft assembly 11 shown in FIG. 2 comprises a centrifugal force compensated output coupling 16, flexible diaphrams 13, a center tube 15 and a flanged end 17. The flexible couplings accomodate any misalignment between the spline end of shaft assembly 11 and the flanged end 17. An external helix member 20 is attached to the inner end of coupling 16. A splined sleeve 22 is fit over the hollow external helix member 20. Splined sleeve 22 has a straight outer spline and a helical inner spline. Four bars 24 are supported on pins 26 to urge splined sleeve 22 away from pivot point 26 as shaft assembly 11 is rotated.

Figure 3:
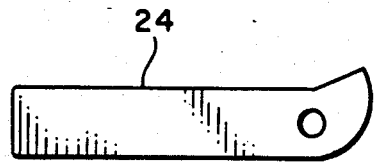
FIG. 3 is an enlarged view of one of the centrifugal weights utilized in the spline of FIG. 1.
Figure 4:
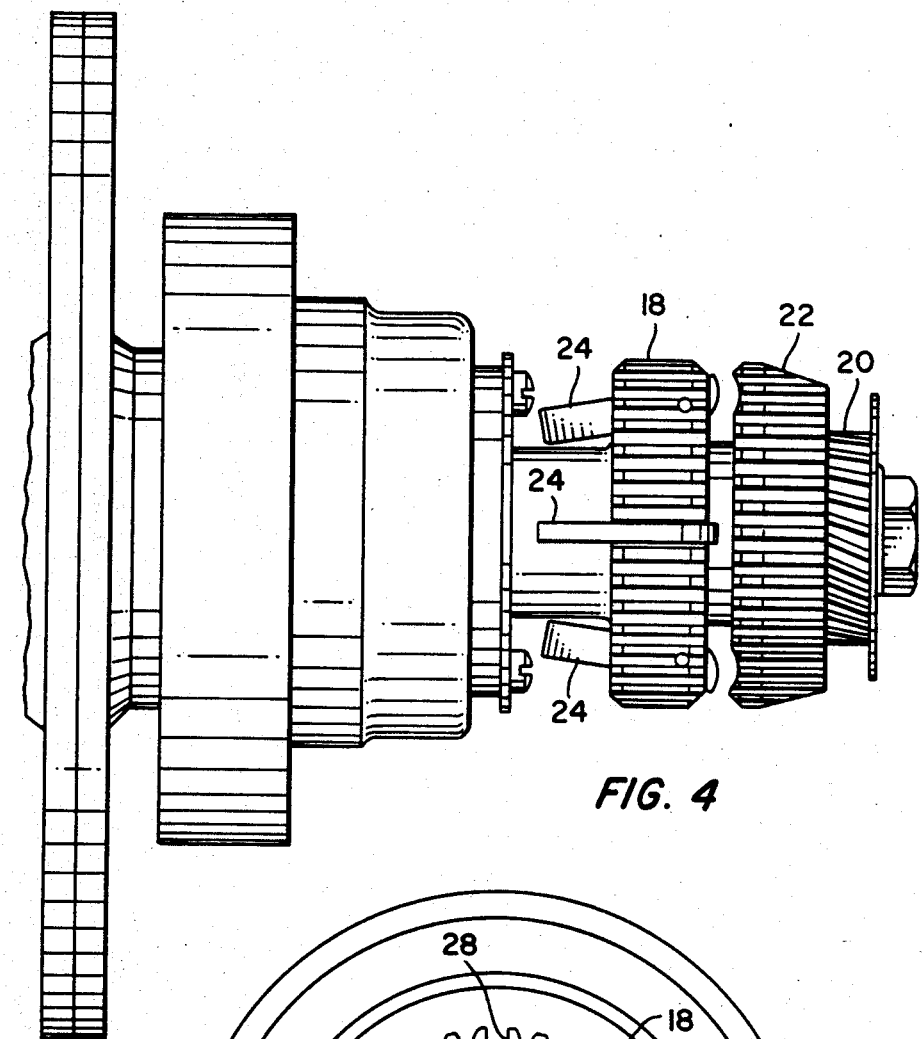
FIG. 4 is a view of the spline of FIG. 1 with some parts not completely assembled.
Figure 5:
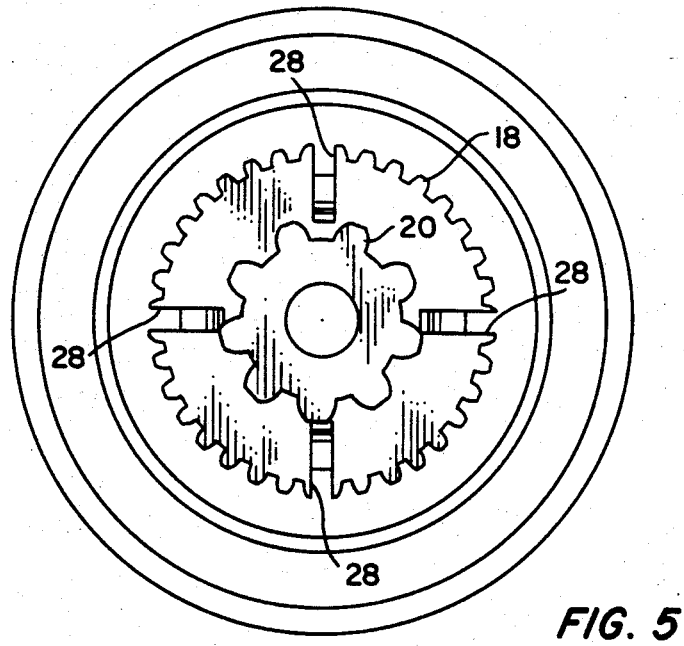
FIG. 5 is an end view of the spline shown in FIG. 4 with retain bolt, washers and movable sleeve omitted for clarity.

The four bars 24, utilized in coupling 16, extend through openings 28 formed in the external spline portion 18 of coupling 16. As shown in FIG. 3, the curved end of bar 24 is shaped so that as the longer end moves outward, as shaft assembly 11 is rotated the curved end engages spline sleeve 22 and moves sleeve 22 axially on helix member 20. Forcing spline sleeve 22 axially out along the helical spline member 20 creates a torque on the straight spline of the spline sleeve 22 opposite that of the main torque transmitting spline 18 of the output coupling 16. As a result, the teeth on straight spline 18 and the teeth 29 on spline sleeve 22 are effectively locked or wedged into the mating internal spline 14. By locking the internal and external splines, rocking is prevented and the spline will show less wear. The hollow external helix member 20 includes a square end portion 32 which fits within a square recess 34 in coupling 16. A bolt 36 holds member 20 axially in place. The square end 32 and the mating square opening 34 prevent spinning of helical member 20.

In order to align the straight spline teeth 29, on the spline sleeve 22, with the straight spline teeth 18, on the output coupling 16, washer type shims are utilized between the end of the hollow external helix member 20 and the inside of square hole 34 in output coupling 16. These thin shims can be layered to variable thicknesses which may be necessary to provide straight alignment of spline teeth 18, 29.

In order to hold the spline sleeve in place before output coupling 16 is inserted into shaft 10, a retainer washer 38 is provided. A bearing 39 supports internal spline 14 from housing 12. Oil seal 40 holds in lubrication and a wear-resistant ring completes the assembly for a pilot surface.

Referring now to FIGS. 6 and 7 therein shown another embodiment of a spline with an anti-backlash device according to the teaching of the present invention. Output coupling 56 functions similar to output coupling 16. Output coupling 56 has a main torque transmitting spline 58. A sleeve member 62 having locking spline teeth 59 is also provided. During operation, sleeve 62 is rotated relative to coupling 58. Cylinders 64, which provide the force for urging spline sleeve 62 to rotate, are disposed between an inner ramp on sleeve 62 and an inner ramp on the main body of coupling 56. An inner retainer 67 supports cylinders 64. As the spline rotates, the cylinders 64 are forced outward urging spline sleeve 62 to rotate relative to coupling 56. This causes the sleeve 62 to rotate slightly and engage the teeth on an internal spline opposite the sides which are engaged by the main force transmitting spline 58.

What is claimed:

1. A spline with an integral anti-backlash device for engaging an internal spline comprising:
   a coupling including an external spline member, having spline teeth, for fitting into mating engagement in the internal spline;
   a spline sleeve, having spline teeth, connected to said coupling in alignment with said external spline member and moveable circumferentially with respect to said external spline member; and,
   means responsive to centrifugal force to move said spline sleeve, as said external spline rotates, to circumferentially displace the spline teeth on said external spline member and the spline teeth on said spline sleeve to lock into the mating internal spline.

2. A spline as claimed in claim 1 comprising:
   an external helix portion on which said spline sleeve moves; and,
   a lever pinned to said coupling having one end which moves outward under centrifugal force as said external spline rotates and the other end shaped to engage said spline sleeve causing said spline sleeve to move axially and circumferentially on said external helix portion.

3. A spline as claimed in claim 2 wherein:
   said external helix portion is hollow and includes a shaped end which fits into a similarly shaped opening in said coupling to prevent rotary movement of said external helix portion with respect to said coupling; and,
   a bolt for holding said external helix portion against axial movement.

4. A spline as claimed in claim 1 comprising:
   centrifugal weights which move outward as said external spline is rotated; and,
   surfaces on said spline sleeve engaged by said centrifugal weight to move said spline sleeve relative to the external spline member as said spline is rotated.

5. A shaft coupling, with anti-backlash means, for connecting to an internal spline comprising:
   a main external spline formed integral with the shaft coupling;
   a sleeve having an external spline matching and being rotatably supported from the shaft coupling with respect to said main external spline; and
   centrifugal force means for rotating said sleeve with respect to said main external spline when the shaft coupling is rotated.

6. A shaft coupling as claimed in claim 5 wherein said centrifugal force means comprises:
   a lever, pivoted intermediate its ends, having a free end which moves outward when the shaft coupling is rotated and a shaped end for engaging and causing said sleeve to rotate.

7. A shaft coupling as claimed in claim 6 comprising:
   a helix member supporting said sleeve causing axial and circumferential movement of said sleeve when moved by said centrifugal force means.

8. A shaft coupling as claimed in claim 5 wherein said centrifugal force means comprises:
   centrifugal weights which move outward as said main external spline is rotated; and,
   formed surfaces on the inside of said main external spline and said spline sleeve which are engaged by said centrifugal weights to rotate said spline sleeve with respect to said main external spline.

9. A shaft assembly for connecting to an internal spline comprising:
   an elongated shaft;
   a plurality of flexible diaphragms disposed along said elongated shaft;
   a main external spline, disposed at one end of said elongated shaft, for engaging the internal spline; and,
   centrifugal locking means activated when said shaft assembly is rotated for providing a force to lock said main external spline within the internal spline when the shaft assembly is driven.

10. A shaft assembly as claimed in claim 9 wherein said centrifugal locking means comprises:
    a sleeve having spline teeth which match spline teeth on said main external spline; and,
    rotating means for circumferentially displacing said sleeve with respect to said main external spline as the shaft assembly rotates for locking the splined end of the shaft assembly in the external spline.

11. A shaft assembly as claimed in claim 10 comprising:
    weights which move outward as said shaft assembly is rotated to engage surfaces on the inside of said sleeve and said main external spline causing relative circumferential displacement of said sleeve and said main external spline.

* * * * *